United States Patent [19]

Frank

[11] Patent Number: 5,799,726

[45] Date of Patent: Sep. 1, 1998

[54] REFRIGERATED MIXING CHAMBER AND METHOD FOR MAKING SAME

[76] Inventor: Jimmy L. Frank, 17 Woodsborough Circle, Houston, Tex. 77055

[21] Appl. No.: 590,117

[22] Filed: Jan. 23, 1996

[51] Int. Cl.⁶ .................................................. F28D 7/10
[52] U.S. Cl. ............. 165/156; 165/109.1; 165/DIG. 320
[58] Field of Search ...................... 165/156, 109.1, 165/169

[56] References Cited

U.S. PATENT DOCUMENTS

| | | |
|---|---|---|
| 760,843 | 5/1904 | Bland . |
| 1,537,908 | 5/1925 | Willmann . |
| 1,694,532 | 12/1928 | Dennison . |
| 2,035,213 | 3/1936 | Anderson ........................ 257/195 |
| 2,706,619 | 4/1955 | Graves et al. .................... 257/246 |
| 2,706,620 | 4/1955 | Graves ............................. 257/246 |
| 2,908,486 | 10/1959 | Thornburg ...................... 257/95 |
| 3,270,806 | 9/1966 | Borrini ............................ 165/156 |
| 3,296,817 | 1/1967 | Stoelting ......................... 62/225 |
| 3,469,415 | 9/1969 | Cornelius ........................ 62/394 |
| 3,545,063 | 12/1970 | Mitchell ........................ 29/157.3 |
| 3,572,675 | 3/1971 | Maloney .......................... 266/41 |
| 4,332,073 | 6/1982 | Yoshida et al. ................ 29/421 R |
| 4,516,044 | 5/1985 | Bone ............................... 310/64 |
| 4,552,724 | 11/1985 | Matsumoto et al. ............ 422/138 |
| 4,577,481 | 3/1986 | Staat ................................ 72/68 |
| 4,849,594 | 7/1989 | Balzer .......................... 219/10.43 |
| 5,148,861 | 9/1992 | Colvin et al. .................... 165/78 |
| 5,344,508 | 9/1994 | Gilman et al. .................. 148/514 |
| 5,419,150 | 5/1995 | Kaiser et al. .................... 62/342 |

FOREIGN PATENT DOCUMENTS

| | | | |
|---|---|---|---|
| 650795 | 10/1962 | Canada ............................ | 165/156 |
| 0 152 941 A2 | 8/1985 | European Pat. Off. ........ | F25B 39/02 |
| 0 519 252 A1 | 12/1992 | European Pat. Off. ......... | F25C 1/14 |
| 2268471 | 11/1975 | France ............................. | A23G 9/16 |
| 71215 | 10/1893 | Germany ......................... | 165/156 |
| 848656 | 9/1952 | Germany . | |
| 532 | of 1858 | United Kingdom ............ | 165/156 |
| 442124 | 10/1934 | United Kingdom . | |
| 683159 | 11/1952 | United Kingdom ............ | 165/156 |
| 2089702 | 6/1982 | United Kingdom .......... | B21B 23/00 |
| WO 81/03539 | 12/1981 | WIPO . | |

OTHER PUBLICATIONS

International Searching Authority: International Application No.: PCT/US 97/00942; International Filing Date: Jan. 22, 1997.

*Primary Examiner*—Allen J. Flanigan
*Attorney, Agent, or Firm*—Arnold, White & Durkee

[57] ABSTRACT

An improved refrigerated mixing chamber for the food and beverage industry and associated method of manufacture is provided. The chamber is manufactured from a pre-formed piece of stainless steel that has been cold pressed into shape so that it has no axial welds. The device further includes an outer sleeve that is shrink fitted around the chamber. The sleeve has an advancing helically groove formed on its inside surface. The combination of the helical groove and the outer surface of the chamber forms a helical passageway through which refrigerant flows. The method of manufacture causes the grooves in the outer sleeve to interfere with the outer surface of the chamber such that an advancing helical rib is formed around the chamber. This rib aids in strengthening the chamber.

10 Claims, 3 Drawing Sheets

5,799,726

1

REFRIGERATED MIXING CHAMBER AND METHOD FOR MAKING SAME

FIELD OF THE INVENTION

The present invention relates generally to heat exchangers, and more particularly to an improved mixing chamber that is used to produce frozen beverages, ice cream and other frozen food products.

BACKGROUND OF THE INVENTION

Typically, heat exchangers used in the food processing industry are manufactured out of stainless steel. In these systems refrigeration tubing is wrapped around the outside of the cooling chamber to cool the chamber while scraper blades rotate within the cooling chamber to stir the product and prevent it from freezing to the chamber's interior walls.

Ease of construction and reliability are very important and many prior art systems sacrifice heat transfer efficiency to achieve these ends. Known heat exchangers are typically constructed out of a sheet of stainless steel that has been rolled into a tube and welded along its longitudinal axis. These known exchangers also have both ends circumferentially welded into place. The welding associated with this type of construction may cause distortion in the thin stainless steel sheet metal as well as other problems normally associated with any welding process.

This welded assembly is then copper plated on its exterior so that solder can adhere to it. Copper refrigeration tubing is then wound circumferentially about the chamber in an advancing helical manner. It is through this tubing that the refrigerant passes. The copper tubing is then soldered into place. It is desirable to fully solder the copper tubing to the chamber so that optimum conductive heat transfer can be achieved. However, this is seldom the case as many areas of non-solder adherence occur and the conductive heat transfer capabilities are greatly compromised.

Heat is transferred in such a system from the food product through the wall of the stainless steel chamber, through the copper plating, through the solder, through the copper tubing wall, and finally to the refrigerant contained within the tubing. Although this is generally a reliable manner of manufacture, the thermal and heat transfer performance characteristics of this system are less than ideal.

This manufacturing method also possesses additional undesirable consequences. One such consequence is that a chamber manufactured by rolling and welding a sheet of stainless steel may not be truly round and may be subject to failure at the weld point. If the chamber is not truly round, then a good refrigerant seal may not be possible, thereby creating the risk that the refrigerant might leak out of system. Furthermore, the soldering process requires skilled labor and is not generally consistent from one assembly to another. An additional problem inherent in the prior art is that the copper plating and soldering processes require disposal of chemical wastes.

The present invention is directed at maximizing heat transfer in a heat exchanger by providing a seamless inner chamber having a minimum wall thickness and allowing direct refrigerant contact to the inner chamber.

SUMMARY OF THE INVENTION

In one aspect of the present invention, a refrigerated chamber system is provided. The system includes a cylindrically-shaped seamless inner chamber having an advancing helically-shaped rib formed around its outer circumferential surface by a cylindrically-shaped outer sleeve which is axially shrink fitted over the inner chamber. The advancing helically-shaped rib strengthens the inner chamber. In the preferred embodiment, the wall of the cylindrically-shaped inner chamber is between 0.020 and 0.032 inches thick and has a yield strength of between approximately 175,000 and 300,000 psi (lbs/in$^2$). Also, in the preferred embodiment, the wall of the inner chamber is thicker at its ends than it is in its mid-section.

The cylindrically-shaped outer sleeve has an advancing helical groove formed on its inner circumferential surface. The helical groove and the outer surface of the inner chamber form a passageway through which a refrigerant passes which cools the product contained within the inner chamber.

In an other aspect of the present invention, a method of manufacturing a refrigerated chamber system is provided. The method includes the step of heating the cylindrically-shaped outer sleeve until it expands to the point where its inner diameter is larger than the outer diameter of the cylindrically-shaped inner chamber over which it is disposed. The cylindrically-shaped outer sleeve is then cooled so that it contracts and forms an interference fit with the cylindrically-shaped inner chamber.

The cylindrically-shaped inner chamber is formed by either roll forming or flow forming a heavy-wall preform on a spinning mandrel with rolls that have a force that is substantially greater than the yield strength of the stainless steel preform until the wall of the inner chamber is between 0.020 and 0.032 inches thick. The inner chamber has an open end and a closed end. The closed end of the inner chamber is machined to a close tolerance prior to the forming process. It is machined with a seal cavity and hole which is adapted for receipt of a shaft from a beater motor which rotates a scraper blade in the inner chamber in frozen beverage machine applications. An elastomeric seal is disposed within the cavity and seals the inner chamber so that product does not leak out of the inner chamber. The beater motor is mounted to the side wall at a perpendicular angle. A faceplate is attached to the open end of the inner chamber.

A helical groove which forms the passageway through which the refrigerant flows is formed by machining the groove into the inner circumferential surface of the outer sleeve. The method further includes the step of sealing the ends of the cylindrically-shaped inner chamber and cylindrically-shaped outer sleeve by inserting a pair of elastomeric rings between the inner chamber and the outer sleeve.

BRIEF DESCRIPTION OF THE DRAWINGS

The above and other aspects and advantages of the present invention will become apparent upon reading the following detailed description, taken in conjunction with the accompanying drawings wherein.

DETAILED DESCRIPTION OF THE DRAWINGS

Figure 1A:
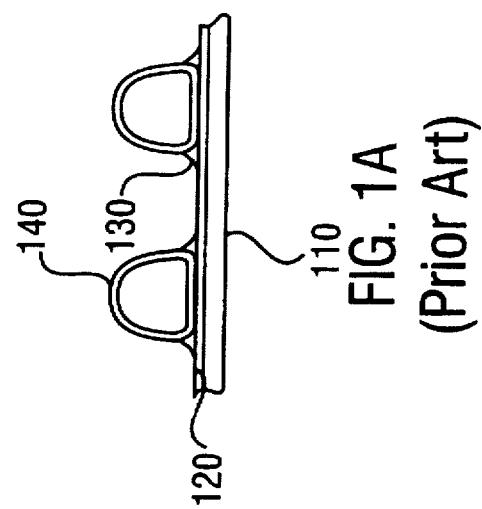
FIG. 1A is an enlarged partial cross-sectional view of the refrigerated chamber system shown in FIG. 1 illustrating the arrangement of the refrigerant tubing on the inner chamber.
Figure 1:
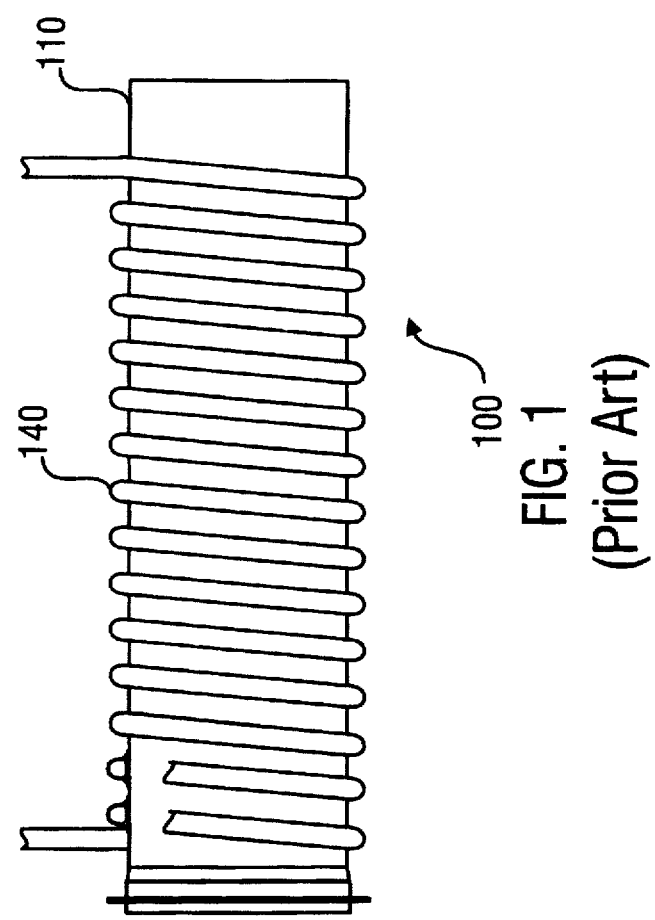
FIG. 1 is a side-view of a prior art refrigerated chamber system.

Turning now to the drawings and referring initially to FIG. 1, a prior art refrigerated chamber system is shown generally by reference numeral 100. For simplicity of illustration, FIG. 1 does not display the axial weld that assembles the cylinder portion or the circumferential welds that assemble both of the ends onto the stainless steel chamber. The system 100 includes a cylindrically-shaped inner chamber 110 which is generally manufactured out of stainless steel having a yield strength in the range of 30–40,000 psi.

FIG. 1A also shows an enlarged view of a portion of the refrigerated chamber system 100. The outer surface of the chamber 110 is coated with a layer of copper plating 120 that is applied using methods well known in the art. The copper plating 120 provides a substrate for solder 130 to adhere to. The solder 130 is used to attach a copper refrigeration tube 140 to the chamber 110. The copper refrigeration tube 140 is wrapped in an axially advancing manner around the chamber 110. The copper refrigeration tube 140 functions as the evaporator in the refrigeration system.

As can be readily seen in FIG. 1, the heat transferred from a product contained within chamber 110 to the refrigerant in the tubing 140, must pass through the wall of the stainless steel chamber 110, through the copper plating 120, through the solder 130, and finally through the copper refrigeration tube 140. Because heat is transferred through so many surfaces in this systems, the heat transfer characteristics are less than ideal.

Figure 2:
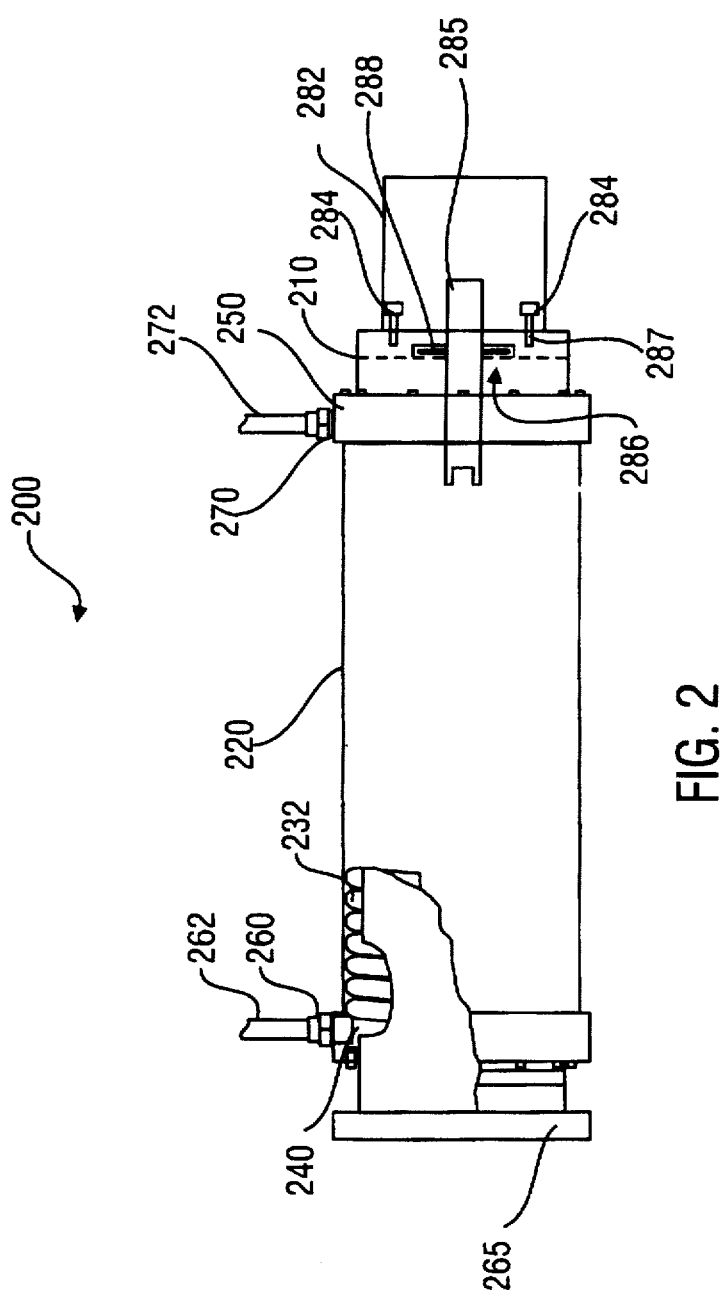
FIG. 2 is a side-view of the refrigerated chamber system according to the present invention.

The preferred refrigerated chamber system according to the present invention is indicated generally by reference numeral 200, shown in FIG. 2. The chamber system 200 includes a cylindrically-shaped inner chamber 210 which is preferably formed of stainless steel and an outer sleeve 220 which is shrinkably fitted around the inner chamber. The inner chamber 210 is preferably 24.0 inches long and has an inner diameter of approximately 4.950 inches and an outer diameter of approximately 5.0 inches, measured at its center. The outer sleeve 220 is preferably 18.0 inches long and has an inner diameter of approximately 5.0 inches and an outer diameter of approximately 6.25 inches.

Figure 2A:
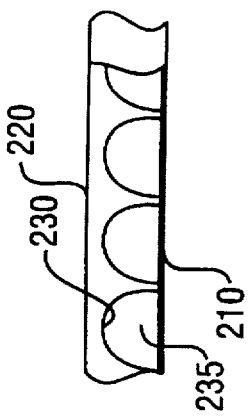
FIG. 2A is an enlarged partial cross-sectional view of the refrigerated chamber system shown in FIG. 2 illustrating the interface between the outer sleeve and the inner chamber.

A helical groove 230 is formed on the inner circumferential surface of the outer sleeve 220. It advances from one end of the outer sleeve 220 to the other. A passageway 235 is formed between the helical groove 230 and the outer surface of the inner chamber 210, through which refrigerant flows and comes into direct contact with the inner chamber, as shown in FIG. 2A. The refrigerant enters the passageway 235 through an inlet 240 and exits the passageway 235 through an outlet 250. The inlet 240 and outlet 250 are disposed at opposite ends of the inner chamber 210.

The inner chamber 210 is unique in that it is one piece. The inner chamber 210 is manufactured by roll or flow forming a heavy-wall preform on a spinning mandrel with rolls until the preform achieves its desired thickness and yield strength. This manufacturing process results in an inner chamber 210 having an opening at one end and a wall that is approximately 0.020–0.032 inches thick. The yield strength of the finished inner chamber 210 is approximately 175,000 psi but may be as high as 300,000 psi. The chamber is thus cold worked into the finished configuration. A faceplate 265 is mounted to the open end of the inner chamber 210 in the manner well known in the art.

The walls in prior art systems are approximately 0.125" thick or more, five times thicker than those of the present invention. Therefore, the inner chamber 210 has significantly improved heat transfer characteristics. Those knowledgeable and skilled in the art of the manufacture of thin wall missile or projectile cases are aware of this manufacturing method of flow-forming or cold working.

Figure 3:
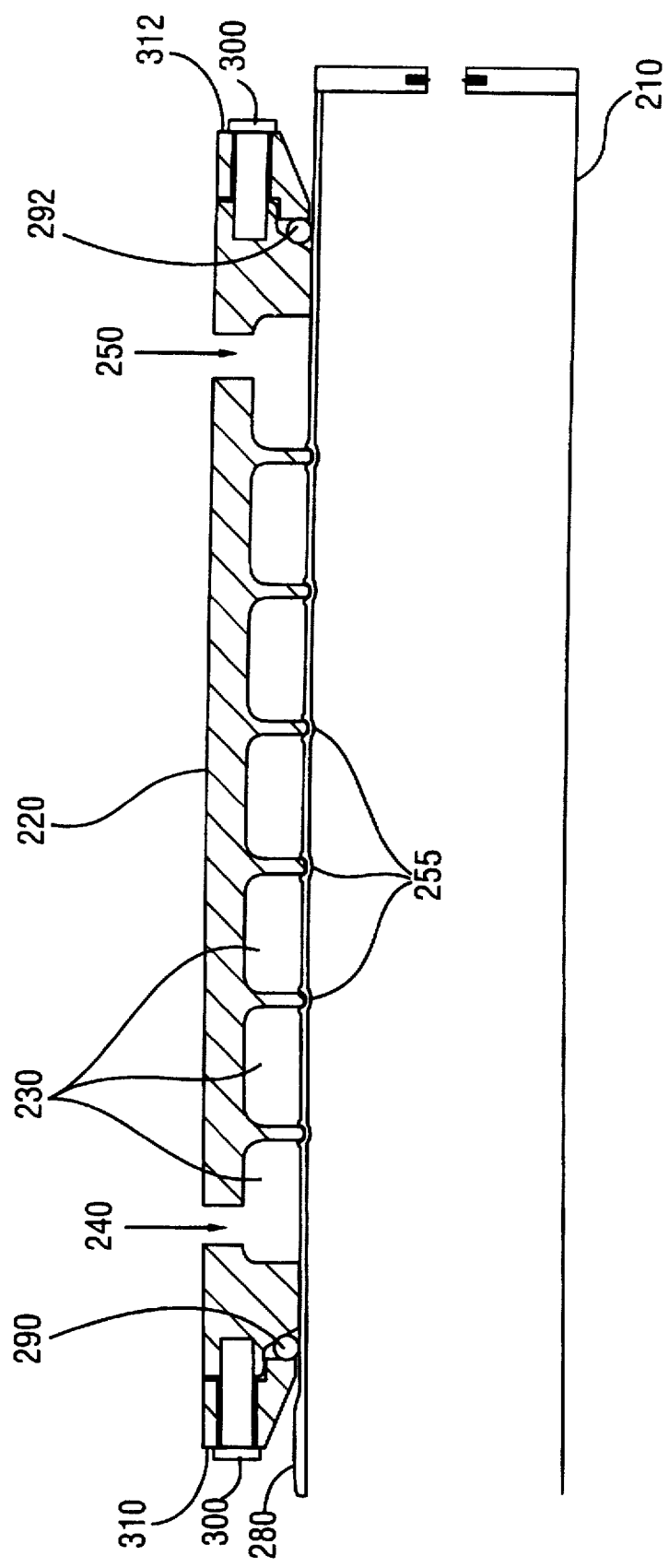
FIG. 3 is an enlarged side view of the refrigerated chamber system shown in FIG. 2 illustrating the sealing means for preventing the refrigerant from leaking out of the system.

The flow-forming process results in a very round tube of very accurate diameter and an extremely uniform wall thickness. Another benefit of this method of manufacture is that the resulting chamber possesses extremely high yield strengths in spite of the fact that the chamber walls are very thin. A chamber manufactured using this process has a higher yield strength and thinner walls than prior art chambers. The high yield strength and the advancing helical ribs 255 are necessary to prevent the chamber 210 from collapsing due to the high refrigeration pressures present in the refrigerant passageway 235. It has been found that the strength of the inner chamber 210 may be further increased during the manufacturing process by forming the chamber so that the ends are thicker than the center. Such a configuration is shown in FIG. 3. The end 280 of the inner chamber 210 in this configuration is preferably 0.120 inches thick.

Another benefit of this cold-working process is that it produces an inner chamber 210 which has a continuous seamless inner circumferential surface, which is ideal for food processing because it eliminates or minimizes interference between the scraper and the inner surface. It also produces an inner chamber 210 which has a continuous seamless outer circumferential surface, which is ideal for sealing the outer sleeve 220 to the outer surface of the chamber.

A beater motor 282 is mounted to the inner chamber 210 on the closed end of the inner chamber which is machined prior to the forming process, as shown in FIG. 2. The thickness of the closed end of the inner chamber 210 is approximately 0.75 inches. The beater motor 282 is mounted with a plurality of bolts 284 which screw into threads formed in the side wall of the inner chamber. A shaft 285, which rotates the scraper blades (not shown), is disposed through a hole 286 formed in the closed end of the inner chamber 210. Surrounding the hole 286 is an inner seal cavity 287 within which sits an elastomeric seal 288 which engages the shaft 285. The elastomeric seal 288 prevents the product contained within the inner chamber 210 from leaking into the outside environment. This arrangement places the shaft 285 exactly at a perpendicular angle to the closed end of the inner chamber 210 and on the center line of the seal cavity 287. It allows the alignment between the shaft 285 and the elastomeric seal 288 to be within very close tolerances and thus prevents seal and shaft wear as well as gear motor failure.

In the preferred embodiment, the outer sleeve 220 is made of a machined or cast aluminum. As persons of ordinary skill in the art will recognize, other materials could alternatively be used, e.g., stainless steel, plastic or other non-ferrous alloys. If the outer sleeve 220 is made from an alloy such as wrought aluminum, the helical groove 230 is formed by machining. If it is made out of a thermoplastic material, it is molded.

In the preferred embodiment, the surface of the helical groove 230 is smooth. However, alternatively the surface could be made rough or modified so that it could induce turbulence into the refrigerant flow. Such induced turbulence may additionally enhance and substantially improve heat transfer inside the assembled device. This surface condition could be created by sand casting the helical groove 230.

Although FIG. 2 depicts a helical groove 230 as a uniform internal circumferentially advancing helix, this is not intended to limit the cross-sectional helical configuration, shape, rate of advancement, or the singularity of the helix. The helical groove 230 could consist of multiple starts of small-beginning, cross-sectional helix changing with longitudinal advancement to other helical cross-sectional areas of different shapes and sizes. Also, the rate of axial advancement could change during longitudinal helix progression into a single or multiple internal, circumferentially advancing helical form.

These alternate embodiments could ideally support the flashing of the refrigerant from liquid to gas and enhance the heat transfer process when combined with the induced turbulence obtained from the surface roughness as previously discussed. As persons of ordinary skill in the art will appreciate other flow patterns could be used to advance the flow of refrigerant that are not helical in nature. FIG. 2 illustrates only the preferred embodiment of the refrigerant passageway 235. Two main objectives in designing a refrigerant passageway are direct contact between the refrigerant and the inner chamber 210, and consistent flow advancement of the vaporizing refrigerant whose specific heat and heat of vaporization initiates heat transfer.

The outer sleeve 220 might alternatively be formed by shrink fitting the ends of an annular tube onto the inner chamber 210. The helical passageway 235 in this embodiment would be formed by inserting a spiral winding between the inner surface of the outer sleeve 220 and the outer surface of the inner chamber 210. The spiral winding would control refrigerant flow and could be made from either a metallic or non-metallic material.

Turning now to the manufacturing process for the outer sleeve 220, the preferred embodiment is manufactured by boring out an aluminum tube. The internal bore of the outer sleeve 220 is finished and machined to an exact size such that an interference fit is obtained at room temperature between the inside diameter of the outer sleeve 220 and the outside diameter of the inner chamber 210. The interference fit is due to the fact that the external diameter of the inner chamber 210 is approximately 0.001 inches greater than the smallest internal diameter of the outer sleeve 220.

After the helical groove 230 has been formed within the outer sleeve 220, the outer sleeve is shrink fit assembled into place onto the inner chamber 210 by heating the outer sleeve 220 to the point where its internal diameter is greater than the external diameter of the inner chamber. The temperature required to cause this expansion is approximately 650° F. Upon reaching the proper temperature, the outer sleeve 220 is quickly placed onto the inner chamber 210. After equalization of temperature between the inner chamber 210 and the outer sleeve 220, the outer sleeve contracts to its original size and permanently locks the two pieces together.

When the outer sleeve 220 returns to its original size, the ridges of the annular ribs forming the helical groove 230 interfere with the walls of the inner chamber 210 to a depth of approximately 0.001–0.003 inches. This interference is necessary to prevent leakage of refrigerant between or underneath the individual internal circumferentially advancing helical forms. Furthermore, the interference causes the formation of a small advancing helical rib 255 in the wall of the inner chamber 210, as shown in FIG. 3. This rib aids in strengthening the inner chamber 210.

The inlet 240 and outlet 250, are formed by first boring a pair of holes through the outer sleeve 220 in such a manner that the holes pass through the helical groove 230, as shown in FIG. 3. In the preferred embodiment, the holes are threaded so that a pair of threaded connectors 260 and 270 may be coupled to the outer sleeve 220, as shown in FIG. 2. Threaded connector 260 is connected to a refrigerant supply line 262 while the threaded connector 270 is connected to a feedback line 272 that returns the refrigerant to the refrigeration system.

There are other methods for attaching the refrigerant lines to the outer sleeve 220. One such alternate method involves casting copper blocks in the outer sleeve 220 so that refrigerant tubing could be soldered into place. Another method involves receivably engaging an elastomeric sealed fitting into a precision bored hole in the outer sleeve 220 that is retained in place with a threaded fastener or soldering directly to the outer sleeve 220 with a solder principally containing a mixture of flux, zinc and aluminum.

Turning now to FIG. 3, a view of the sealing means between the inner chamber 210 and the outer sleeve 220 is shown. This sealing means provides an additional seal to retain the refrigerant in the helical groove 230. FIG. 3 also depicts the thickened chamber end 280 discussed above.

The preferred embodiment, as shown in FIG. 3, includes a pair of elastomeric sealing rings 290 and 292, a plurality of radially disposed threaded fasteners 300, and a pair of movable packing glands 310 and 312 that force the sealing rings 290 and 292 into a preloaded condition such that they seal and contain the refrigerant in the system when the radially disposed threaded fasteners 300 are secured. The fasteners 300 in the preferred embodiment are bolts which pass through holes in the packing glands 310 and 312 and threadably engage the outer sleeve 220, thus coupling the packing glands to the outer sleeve.

Upon proper placement of elastomeric rings 290 and 292 and the packing glands 310 and 312 and securely tightening of the threaded fasteners 300, the elastomeric rings seal and retain the refrigerant that is internally contained in the assembled heat exchanging device. An alternate means of preventing the refrigerant from leaking, includes a pair of packing glands that are similar to packing glands 310 and 312 but are threaded on the outer diameter. In this alternate embodiment, the outer sleeve 220 is threaded on the inner diameter so that the packing glands 310 and 312 could be threadably engaged with the outer sleeve and tightened to preload the elastomeric rings 290 and 292 so as to create a refrigerant seal.

If the outer sleeve 220 is manufactured from a polymer, it could be bonded or epoxied or ultrasonically welded into place. Furthermore, a stainless steel or other metallic ring could be integrally cast into both ends of the sleeve such that a flux solder could be used to solder the sleeve ends to the stainless steel inner chamber 210, thereby achieving a refrigerant seal. Alternately, the refrigerant can be further sealed by soldering the outer sleeve 220 directly to the stainless steel inner chamber 210 by using a zinc/aluminum/flux solder with a closely controlled capillary gap thereby achieving a refrigerant seal.

By changing the geometry of the outer sleeve 220 and the inner chamber 210, it is possible to obtain a refrigerant seal by machined surfaces and interference between the two parts based on the shrinkably disposed engagement of the same. Additional methods of sealing could include but are not limited to soldering, brazing or bonding the outer sleeve 220 to the inner chamber 210.

It should be appreciated by those skilled in the art that the present invention is directed to the assembly of the above described individual components and not the individual components alone. In fact, a prior art refrigeration chamber system which incorporates less than all of the above described individual components may not work. For example, if the above described outer sleeve were shrinkably fit onto a prior art welded inner chamber without enhanced yield strengths, the welded chamber may collapse due to its low yield strength from the stresses imposed on it by the elastomeric seal ring and/or the welded chamber might collapse from the stresses imposed on it by the refrigerant pressures during normal operation.

It should also be appreciated by those of ordinary skill in the art that the heat transfer rate in the refrigeration chamber system according to the present invention is substantially improved over prior art systems due to the continuous and direct contact of refrigerant with the inner chamber. The embodiment of the present invention allows for heat transfer from the product, through the thin stainless steel wall and directly into the pattern controlled, circumfusing turbulent refrigerant.

Those skilled in the art who now have the benefit of the present disclosure will appreciate that the present invention may take many forms and embodiments. Some embodiments have been described so as to give an understanding of the invention. It is intended that these embodiments should be illustrative, and not limiting of the present invention. Rather, it is intended that the invention cover all modifications, equivalents and alternatives falling within the spirit and scope of the invention as defined by the appended claims.

What is claimed is:

1. A refrigerated chamber system, comprising:
   (a) a cylindrically-shaped seamless inner chamber having an advancing helically-shaped rib formed around its circumferential surface for strengthening said inner chamber, said inner chamber being adapted to contain a product to be cooled therein; and
   (b) a cylindrically-shaped outer sleeve axially disposed over the inner chamber, the outer sleeve having an advancing helical groove formed on its inner circumferential surface, the helical groove and the outer surface of the inner chamber forming a passageway through which a refrigerant passes which cools the product contained within the inner chamber.

2. The refrigerated chamber system according to claim 1, wherein the cylindrically-shaped inner chamber is approximately between 0.020 and 0.032 inches thick and has a yield strength of at least approximately 175,000 psi.

3. The refrigerated chamber system according to claim 1, wherein the cylindrically-shaped inner chamber is thicker at its ends than it is in its mid-section.

4. The refrigerated chamber system according to claim 1, wherein the inner surface of the cylindrically-shaped outer sleeve interferes with the outer surface of the cylindrically-shaped inner chamber to a depth of approximately 0.001–0.003 inches.

5. The refrigerated chamber system according to claim 1, wherein the chamber is formed of stainless steel.

6. The refrigerated chamber system according to claim 1, further comprising an inlet which delivers the refrigerant to the passageway and an outlet which removes the refrigerant from the passageway.

7. The refrigerated chamber system according to claim 6, wherein the inlet and the outlet are formed in the cylindrically-shaped outer sleeve at opposite ends.

8. The refrigerant chamber system according to claim 7, further comprising a pair of threaded connectors that are coupled to the inlet and the outlet, the threaded connector coupled to the inlet being connected to a refrigerant supply line and the threaded connector coupled to the outlet being connected to a refrigerant feedback line.

9. The refrigerated chamber system according to claim 1, further comprising sealing means for preventing the refrigerant from leaking out of the system at the respective ends of the inner chamber and outer sleeve.

10. The refrigerated chamber system according to claim 9, wherein the sealing means includes a pair of elastomeric rings disposed between the inner chamber and the outer sleeve on opposite sides of the inner chamber and outer sleeve, an associated pair of packing glands that force the elastomeric rings into a preloaded condition so that they seal and contain the refrigerant in the system, and plurality of fasteners that couple the associated pair of packing glands to the outer sleeve.

* * * * *